US012086262B2

(12) United States Patent
Deppisch et al.

(10) Patent No.: US 12,086,262 B2
(45) Date of Patent: Sep. 10, 2024

(54) SECURE CONTAINER IMAGE BUILDS

(71) Applicant: Red Hat, Inc., Raleigh, NC (US)

(72) Inventors: Christoph R. Deppisch, Grasbrunn (DE); Paolo Antinori, Milan (IT)

(73) Assignee: Red Hat, Inc., Raleigh, NC (US)

( * ) Notice: Subject to any disclaimer, the term of this patent is extended or adjusted under 35 U.S.C. 154(b) by 469 days.

(21) Appl. No.: 17/386,809

(22) Filed: Jul. 28, 2021

(65) Prior Publication Data
US 2023/0036739 A1    Feb. 2, 2023

(51) Int. Cl.
G06F 21/57    (2013.01)
G06F 8/71     (2018.01)
G06F 9/445    (2018.01)

(52) U.S. Cl.
CPC .............. *G06F 21/577* (2013.01); *G06F 8/71* (2013.01); *G06F 9/445* (2013.01); *G06F 2221/033* (2013.01)

(58) Field of Classification Search
CPC .......... G06F 21/577; G06F 8/71; G06F 9/445; G06F 2221/033; G06F 2009/45562; G06F 2009/45587; G06F 9/45558
See application file for complete search history.

(56) References Cited

U.S. PATENT DOCUMENTS

| 8,813,031  | B2  |    | 8/2014  | Agarwal |
|------------|-----|----|---------|---------|
| 9,355,248  | B1  |    | 5/2016  | Wiest et al. |
| 9,436,585  | B1  | *  | 9/2016  | Bak ........................... G06F 8/71 |
| 9,766,915  | B1  | *  | 9/2017  | Emelyanov ............. G06F 9/455 |
| 9,823,915  | B1  | *  | 11/2017 | Maloney ................ G06F 9/4411 |
| 10,235,527 | B1  | *  | 3/2019  | Dalessio ............. G06F 16/2379 |
| 10,379,845 | B2  |    | 8/2019  | Parees et al. |
| 10,515,005 | B1  | *  | 12/2019 | Burrell .................. G06F 11/368 |
| 10,635,437 | B1  | *  | 4/2020  | Kunjuramanpillai ..... G06F 8/75 |
| 10,691,810 | B1  | *  | 6/2020  | Freitag ...................... G06F 8/71 |
| 10,693,899 | B2  | *  | 6/2020  | Levin .................. H04L 63/0227 |
| 10,817,611 | B1  | *  | 10/2020 | Glynn ................... G06F 21/577 |
| 11,093,221 | B1  | *  | 8/2021  | Novy ........................ G06F 8/63 |
| 11,138,314 | B1  | *  | 10/2021 | Gettys .................. H04L 9/3239 |
| 11,200,157 | B1  | *  | 12/2021 | Mathew .............. G06F 11/3688 |
| 11,307,839 | B2  | *  | 4/2022  | Vaddi ........................ G06F 8/71 |
| 11,442,765 | B1  | *  | 9/2022  | Zhang ................. G06F 9/30145 |

(Continued)

OTHER PUBLICATIONS

Author Unknown, "Chapter 2. Source-to-Image (S2I), " Red Hat, 2021, https://access.redhat.com/documentation/en-us/openshift_online/3/html/using_images/source-to-image-s2i , 32 pages.

(Continued)

*Primary Examiner* — Aravind K Moorthy
(74) *Attorney, Agent, or Firm* — Dority & Manning, P.A.

(57) ABSTRACT

A container image builder determines that a first container image is to be built. The container image builder initiates a build container from a build container image. The build container identifies a first dependency to be incorporated into the first container image. The build container accesses vulnerability data that identifies a plurality of dependencies that have one or more vulnerabilities. Based on the vulnerability data, it is determined that the first dependency is devoid of vulnerabilities. In response to determining that the first dependency is devoid of vulnerabilities, the first container image is generated to include the first dependency.

20 Claims, 5 Drawing Sheets

(56) References Cited

U.S. PATENT DOCUMENTS

| | | | |
|---|---|---|---|
| 11,487,538 B1* | 11/2022 | Gove, Jr. | G06F 8/77 |
| 11,487,878 B1* | 11/2022 | Zhang | G06F 9/5077 |
| 11,531,763 B1* | 12/2022 | Gupta | G06F 21/577 |
| 11,552,979 B1* | 1/2023 | Soudhamma | G06F 16/25 |
| 11,595,372 B1* | 2/2023 | Sharifi Mehr | H04L 63/20 |
| 11,762,850 B2* | 9/2023 | Rupprecht | H04L 67/1097 |
| | | | 707/769 |
| 11,783,047 B1* | 10/2023 | Hodgman | G06F 21/577 |
| | | | 726/25 |
| 11,892,418 B1* | 2/2024 | Featonby | G06F 8/71 |
| 2010/0169968 A1* | 7/2010 | Shanbhogue | G06F 12/1408 |
| | | | 711/E12.002 |
| 2014/0115328 A1* | 4/2014 | Allen | H04L 63/0428 |
| | | | 713/165 |
| 2014/0337824 A1* | 11/2014 | St. John | G06F 9/44536 |
| | | | 717/162 |
| 2015/0082298 A1* | 3/2015 | Wang | G06F 8/60 |
| | | | 717/174 |
| 2015/0268948 A1* | 9/2015 | Plate | G06F 21/577 |
| | | | 717/123 |
| 2016/0381075 A1* | 12/2016 | Goyal | G06F 21/64 |
| | | | 713/176 |
| 2017/0109536 A1* | 4/2017 | Stopel | G06F 21/577 |
| 2017/0116042 A1* | 4/2017 | Xu | G06F 9/5083 |
| 2017/0255544 A1* | 9/2017 | Plate | G06F 21/577 |
| 2017/0315795 A1* | 11/2017 | Keller | G06F 11/3006 |
| 2017/0372072 A1* | 12/2017 | Baset | G06F 11/3604 |
| 2018/0025160 A1* | 1/2018 | Hwang | G06F 8/71 |
| | | | 726/25 |
| 2018/0032735 A1* | 2/2018 | Sheth | G06F 21/577 |
| 2018/0046446 A1* | 2/2018 | Turovsky | G06F 9/455 |
| 2018/0129479 A1* | 5/2018 | McPherson | G06F 8/63 |
| 2018/0139238 A1* | 5/2018 | Schultz | H04L 63/0272 |
| 2018/0189089 A1* | 7/2018 | Chen | G06F 9/45558 |
| 2018/0285139 A1* | 10/2018 | Shapira | G06F 9/45558 |
| 2018/0285165 A1* | 10/2018 | Helsley | G06F 9/5077 |
| 2018/0285199 A1* | 10/2018 | Mitkar | G06F 11/2038 |
| 2018/0336351 A1* | 11/2018 | Jeffries | G06F 21/53 |
| 2019/0005246 A1* | 1/2019 | Cherny | G06F 21/577 |
| 2019/0026474 A1* | 1/2019 | Adam | G06F 21/563 |
| 2019/0028490 A1* | 1/2019 | Chen | H04L 63/1416 |
| 2019/0042713 A1* | 2/2019 | Porcelli | G06F 21/14 |
| 2019/0146772 A1* | 5/2019 | Griffin | G06F 8/71 |
| | | | 717/121 |
| 2019/0146816 A1* | 5/2019 | Reno | G06F 21/10 |
| | | | 718/1 |
| 2019/0163901 A1* | 5/2019 | Tien | G06F 21/552 |
| 2019/0303579 A1* | 10/2019 | Reddy | H04L 9/3239 |
| 2019/0310935 A1* | 10/2019 | Shuster | G06F 21/566 |
| 2019/0347121 A1* | 11/2019 | Luo | G06F 9/542 |
| 2019/0347127 A1* | 11/2019 | Coady | G06F 8/63 |
| 2019/0392045 A1* | 12/2019 | De Lima Junior | G06F 12/0875 |
| 2020/0110873 A1* | 4/2020 | Rosendahl | G06F 21/577 |
| 2020/0125344 A1* | 4/2020 | Varghese | G06F 8/37 |
| 2020/0125480 A1* | 4/2020 | Sathyamoorthy | G06F 11/3684 |
| 2020/0150940 A1* | 5/2020 | Li | G06F 8/443 |
| 2020/0150974 A1* | 5/2020 | Li | G06F 9/45558 |
| 2020/0183670 A1* | 6/2020 | Kumar | G06F 8/425 |
| 2020/0202006 A1* | 6/2020 | Shah | G06F 8/77 |
| 2020/0226024 A1* | 7/2020 | Lin | G06F 8/443 |
| 2020/0236093 A1* | 7/2020 | Bannister | H04L 9/0861 |
| 2020/0241867 A1* | 7/2020 | Gainsborough | G06F 8/63 |
| 2020/0242254 A1* | 7/2020 | Velur | G06F 21/552 |
| 2020/0272440 A1* | 8/2020 | Burgazzoli | G06F 8/36 |
| 2020/0310775 A1* | 10/2020 | Nyamars | G06F 8/60 |
| 2020/0320203 A1* | 10/2020 | Ting | G06F 21/577 |
| 2020/0356681 A1* | 11/2020 | Sun | G06F 21/604 |
| 2020/0359451 A1* | 11/2020 | Reno | G06F 9/45558 |
| 2020/0364072 A1* | 11/2020 | Raja Jayraman | G06F 9/45558 |
| 2020/0410106 A1* | 12/2020 | Nadgowda | G06F 21/566 |
| 2020/0412769 A1* | 12/2020 | Yi | H04L 63/205 |
| 2021/0019193 A1* | 1/2021 | Ffrench | G06F 9/5061 |
| 2021/0042217 A1* | 2/2021 | Hwang | G06F 11/3604 |
| 2021/0056209 A1* | 2/2021 | Fox | G06F 21/563 |
| 2021/0103450 A1* | 4/2021 | Prasad | G06F 9/45558 |
| 2021/0126949 A1* | 4/2021 | Nadgowda | H04L 63/1433 |
| 2021/0141645 A1* | 5/2021 | Kramer | G06F 8/63 |
| 2021/0141717 A1* | 5/2021 | Ananthapur Bache | G06F 11/3688 |
| 2021/0149685 A1* | 5/2021 | Reinders | G06F 9/45558 |
| 2021/0255846 A1* | 8/2021 | Mamgain | H04L 67/34 |
| 2021/0271777 A1* | 9/2021 | Netsch | H04L 67/02 |
| 2021/0281597 A1* | 9/2021 | Guiroux | H04L 63/1433 |
| 2021/0306304 A1* | 9/2021 | Hwang | G06F 21/53 |
| 2022/0004643 A1* | 1/2022 | Sloane | G06N 5/04 |
| 2022/0075760 A1* | 3/2022 | Wu | G06F 16/188 |
| 2022/0083667 A1* | 3/2022 | Anwar | G06F 8/75 |
| 2022/0116216 A1* | 4/2022 | Wolfson | G06F 21/51 |
| 2022/0122016 A1* | 4/2022 | Krishnamoorthy | G06N 10/00 |
| 2022/0147560 A1* | 5/2022 | Chen | G06F 16/535 |
| 2022/0164170 A1* | 5/2022 | Benton | G06F 8/75 |
| 2022/0222351 A1* | 7/2022 | Levin | G06F 8/71 |
| 2022/0318395 A1* | 10/2022 | Janakiraman | G06F 21/577 |
| 2022/0318396 A1* | 10/2022 | Deng | G06F 21/577 |
| 2022/0366055 A1* | 11/2022 | Malvankar | G06N 3/08 |
| 2022/0374218 A1* | 11/2022 | Monteiro Vieira | G06F 8/433 |
| 2022/0398324 A1* | 12/2022 | Bosch | G06F 21/577 |
| 2023/0004650 A1* | 1/2023 | Chapman | G06F 21/54 |
| 2023/0025526 A1* | 1/2023 | Grzybek | G06F 21/57 |
| 2023/0027810 A1* | 1/2023 | Pokorny | G06F 8/71 |
| 2023/0061121 A1* | 3/2023 | Tosevska | A61K 31/121 |
| 2023/0297348 A1* | 9/2023 | Wang | G06F 8/61 |
| | | | 717/140 |

OTHER PUBLICATIONS

Michas, N., "OWASP Vulnerability Checks With Maven," ITNEXT, Mar. 24, 2020, https://itnext.io/owasp-dependency-check-maven-vulnerabilities-java-898a9cf99f5e, 7 pages.

Pashchenko, I. et al., "Vulnerable Open Source Dependencies: Counting Those That Matter," ESEM '18: Proceedings of the 12th ACM/IEEE International Symposium on Empirical Software Engineering and Measurement, Oct. 11-12, 2018, Oulu, Finland, Association for Computing Machinery, 11 pages.

Ponta, S. et al., "Detection, assessment and mitigation of vulnerabilities in open source dependencies," Empirical Software Engineering, vol. 25, Jun. 30, 2020, Springer, pp. 3175-3215.

Plate, H. et al., "Impact assessment for vulnerabilities in open-source software libraries," arXiv:1504.04971v2 [cs.CR], Apr. 21, 2015, https://arxiv.org/pdf/1504.04971.pdf, 11 pages.

Vermeer, B., "Fixing vulnerabilities in Maven projects," Synk, Sep. 14, 2020, https://snyk.io/blog/fixing-vulnerabilities-in-maven-projects/, 6 pages.

* cited by examiner

SECURE CONTAINER IMAGE BUILDS

BACKGROUND

A container image is a standalone executable package of software that includes everything needed to run an application. A container image typically includes an application and one or more dependencies needed for the application to run, such as system tools, system libraries, and the like.

SUMMARY

The examples disclosed herein implement a container build system that, prior to generating an application container image, verifies that any dependencies that will be included in the application container image do not contain any vulnerabilities.

In one implementation a method is provided. The method includes determining, by a container image builder executing on a computing device, that a first container image is to be built. The method further includes initiating, by the container image builder, a build container from a build container image. The method further includes identifying, by the build container, a first dependency to be incorporated into the first container image. The method further includes accessing, by the build container, vulnerability data that identifies a plurality of dependencies that have one or more vulnerabilities. The method further includes, based on the vulnerability data, determining that the first dependency is devoid of vulnerabilities and, in response to determining that the first dependency is devoid of vulnerabilities, generating the first container image to include the first dependency.

In another implementation a computer system is provided. The computer system includes one or more processor devices of one or more computing devices to determine, by a container image builder, that a first container image is to be built. The one or more processor devices are further to initiate, by the container image builder, a build container from a build container image. The one or more processor devices are further to identify, by the build container, a first dependency to be incorporated into the first container image. The one or more processor devices are further to access, by the build container, vulnerability data that identifies a plurality of dependencies that have one or more vulnerabilities. The one or more processor devices are further to, based on the vulnerability data, determine that the first dependency is devoid of vulnerabilities and, in response to determining that the first dependency is devoid of vulnerabilities, generate the first container image to include the first dependency.

In another implementation a non-transitory computer-readable storage medium is provided. The non-transitory computer-readable storage medium includes executable instructions to cause one or more processor devices of one or more computing devices to determine, by a container image builder, that a first container image is to be built. The instructions further cause the one or more processor devices to initiate, by the container image builder, a build container from a build container image. The instructions further cause the one or more processor devices to identify, by the build container, a first dependency to be incorporated into the first container image. The instructions further cause the one or more processor devices to access, by the build container, vulnerability data that identifies a plurality of dependencies that have one or more vulnerabilities. The instructions further cause the one or more processor devices to, based on the vulnerability data, determine that the first dependency is devoid of vulnerabilities and, in response to determining that the first dependency is devoid of vulnerabilities, generate the first container image to include the first dependency.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
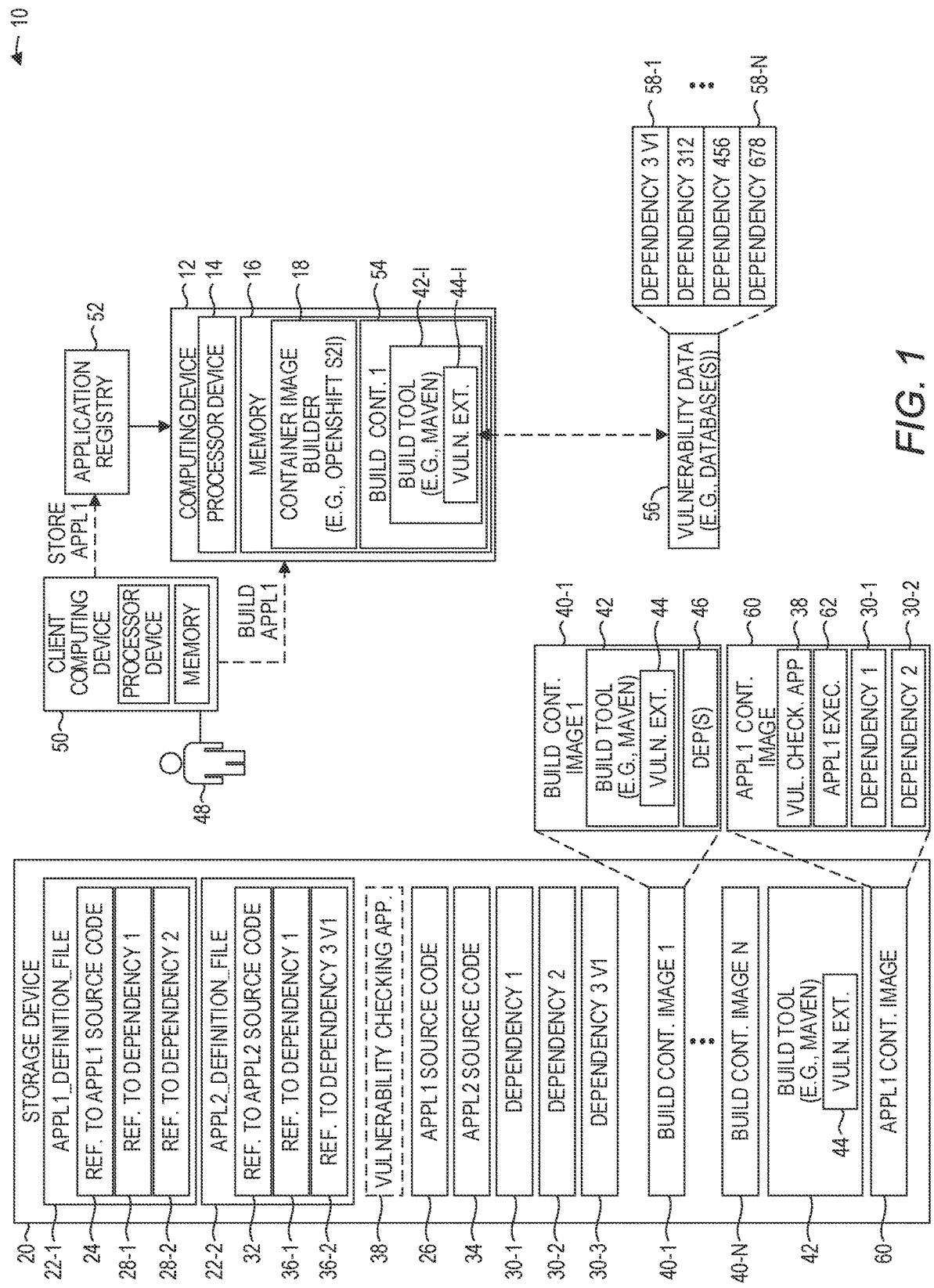
FIG. 1 is a block diagram of an environment in which examples disclosed herein may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

A container image is a standalone executable package of software that includes everything needed to run an application. A container image typically includes an application and one or more dependencies needed for the application to run, such as system tools, system libraries, and the like.

Many dependencies in container images are executable files. Such dependencies may have known vulnerabilities that, if exploited, facilitate nefarious behavior if installed on a computing device. Vulnerability data exists that identifies known vulnerabilities in files, including executable files, that may be a dependency in a container image. An example of vulnerability data is the National Vulnerability Database which is frequently updated to identify newly discovered vulnerabilities.

Containerization technologies are increasingly popular due to the relatively reduced resource utilization compared to other virtualization technologies, such as virtual machines. A container image typically includes at least one executable file that provides a desired functionality, and a number of other files, referred to herein as dependencies, that are required for the executable file to properly execute, including, by way of non-limiting example, system libraries and system tools.

A container image is typically generated using a build file, such as a Dockerfile, that contains instructions that identify the contents of the desired container image, which may include, for example, an application executable and a plurality of dependencies. A build tool, such as Docker, accesses the Dockerfile and generates the container image to include the application executable and the dependencies. The container image may then be distributed to any number of other computing devices. Computing devices subsequently initiate runtime containers from the container image. If the dependencies contained any vulnerabilities, the computing systems may be susceptible to nefarious activities such as hacking, ransomware, or the like.

Container build systems exist, such as OpenShift's source to image system, that utilize a build container image to generate application container images. The build container image includes logic that, when executed as a container, generates an application container image that includes the desired components, such as an application executable and any required dependencies.

Such container build systems inherently rely on users of the container build system to ensure that dependencies do not contain vulnerabilities. Such reliance may be misplaced and the application container images generated by the container build system may inadvertently generate application container images that include dependencies that contain vulnerabilities.

The examples disclosed herein implement a container build image of a container build system, that, prior to generating an application container image, verifies that the dependencies that will be included in the application container image do not contain any vulnerabilities.

In some examples, the container build image not only verifies that dependencies do not contain known vulnerabilities but also inserts a vulnerability checker into the generated application container image. The container build image generates the application container image such that when a container is initiated from the application container image, the vulnerability checker is initially executed to verify that the dependencies in the container image do not contain any known vulnerabilities. In this manner, dependencies, which at container build time had no known vulnerabilities, may later be determined to contain a vulnerability at runtime, and prevented from execution.

FIG. 1 is a block diagram of an environment 10 in which examples disclosed herein may be practiced. The environment 10 includes a computing device 12 that in turn includes a processor device 14 and a memory 16. The memory 16 includes a container build system that includes a container image builder 18 that is configured to cause the generation of an application container image (sometimes referred to herein as a "container image" for purposes of brevity) via a build container, as will be discussed in greater detail herein. While for purposes of illustration the container image builder 18 is illustrated as a single component executing on the computing device 12, in practice, the container image builder 18 may comprise any number of components that interact with one another to implement the functionality described herein, and which may run on any number of computing devices. In some implementations, aspects of the container image builder 18 may be implemented by the OpenShift® source-to-image (S2I) tool, available from Red Hat®. The examples disclosed herein may utilize any containerization technologies, such as, by way of non-limiting example, OpenShift®, Docker, Kubernetes, or the like. The phrase "container" when used alone herein refers to a runtime instance of a container image.

A storage device 20 may include one or more application definition files 22-1-22-2 (generally, application definition files 22). While for purposes of illustration only two application definition files 22 are shown, in practice, the storage device 20 may include hundreds or thousands of application definition files 22. Each application definition file 22 may identify one or more application files, such as scripts, executables, source code files, or the like, and one or more dependencies, such as system tools, libraries, or other executable or data files needed for the application to properly execute in a container. In some examples, one or more of the application definition files 22 may comprise Maven™ Project Object Model (POM) XML files.

In this example, the application definition file 22-1 includes an application file reference 24 that identifies an application source code 26. The application definition file 22-1 also includes two dependency references 28-1, 28-2, which refer to dependencies 30-1, 30-2, respectively. The application definition file 22-2 includes an application file reference 32 that identifies an application source code file 34. The application definition file 22-2 also includes two dependency references 36-1, 36-2, which refer to dependencies 30-1, 30-3, respectively.

The storage device 20 may also include a vulnerability checking application 38 that is configured to access vulnerability data that identifies dependencies that have vulnerabilities.

The storage device 20 may include a plurality of build container images 40-1-40-N, each of which is configured to, when initiated as a container, cause the generation of a container image that includes an application and one or more dependencies. The storage device 20 includes a build tool 42 that is configured to determine whether any dependencies that will be part of a generated container image contain any vulnerabilities. In one implementation, the build tool 42 comprises the Maven™ build automation tool that has been modified to have a vulnerability extension 44 that carries out the functionality of determining whether any dependencies that will be part of a generated container image contain any vulnerabilities. The Maven™ build automation tool is a build tool for container images that utilize Java. The Maven™ build automation tool includes a feature that allows the development of custom "extensions" that the Maven™ build automation tool will execute at runtime of the Maven™ build automation tool. Thus, by modifying the Maven™ build automation tool to include the vulnerability extension 44, any subsequently created build container images 40 that are used to create container images that utilize Java will automatically incorporate the functionality of determining whether any dependencies that will be part of a generated container image contain any vulnerabilities by virtue of the modification of the build tool 42 to include the vulnerability extension 44. The build container image 40-1 includes the build tool 42 and vulnerability extension 44, and one or more dependencies 46. Table 1 illustrates example pseudocode for implementing the vulnerability extension 44 in the Maven™ build automation tool such that the vulnerability extension 44 becomes part of the Maven™ build lifecycle.

TABLE 1

```
@Component( role = SecurityExecutionListener.class )
public class SecurityExecutionListener implements
ProjectExecutionListener {
@Override
public void beforeProjectExecution(
ProjectExecutionEvent projectExecutionEvent)
throws LifecycleExecutionException {
Model projectModel = projectExecutionEvent.getProject( ).getModel( );
checkForVulnerabilities(projectModel.getDependencies( )));
}
private void checkForVulnerabilities(List
dependencies)
throws LifecycleExecutionException {
// Verify security on all dependencies and throw
LifecycleExecutionException on unsolved CVEs
...
}
...
}
```

While solely for purposes of illustration and simplicity only one storage device 20 is shown, in practice, the various files discussed herein as being stored on the storage device 20 may be stored on any number of different storage devices.

With this background, an example of secure container image builds will be discussed. Assume that the container image builder 18 determines that a container image is to be built. The container image builder 18 may make this determination in any suitable manner. In one example, a user 48 may access a client computing device 50 and send, via the client computing device 50, a request to the container image builder 18 to build the container image. The request may include, for example, information identifying a location of application information regarding a first application to be included in the first container image. The information may be, for example, a folder or a file name. The application information may be a configuration file, or other data file, that identifies the application source code file and one or more dependencies. The information may comprise, for example, the name and location of the application definition file 22-1. In some implementations, the application information may be the actual application source code file and the one or more dependencies, or a folder in which the application source code file and the one or more dependencies are located. In response to the request, the container image builder 18 determines that the container image is to be built.

In another example, a request may be automatically generated in response to some event. For example, the user 48 may develop or modify an application source code file, and cause the application source code file to be stored in an application registry 52. In response to the application source code file being stored in the application registry 52, the application registry 52 may automatically generate and send a request to the container image builder 18 to build the container image. The request may include information identifying a location of application information regarding a first application to be included in the first container image. In response to the request, the container image builder 18 determines that the container image is to be built.

The container image builder 18 initiates a build container 54 from the build container image 40-1. In some examples, the container image builder 18 may utilize only the build container image 40-1 to generate container images. In other examples, the container image builder 18 may select a particular build container image 40 of the plurality of build container images 40-1-40-N based on some criteria. For example, the container image builder 18 may analyze an application file, such as the application definition file 22-1, or the application source code 26, and based on an attribute of the application file, select the build container image 40-1 from the plurality of build container images 40-1-40-N. In this example, the container image builder 18 may determine that the application file indicates that Java technology will be used by the application source code 26, and the container image builder 18 may utilize the build container image 40-1 for all container images that will include Java technology.

The build container 54 executes in the memory 16 and includes a build tool instance 42-I, which is a runtime instance of the build tool 42, and a vulnerability extension instance 44-I, which is a runtime instance of the vulnerability extension 44. The build container 54 identifies the dependencies 30-1 and 30-2 as dependencies that will be incorporated into the container image to be built. In this example, the build container 54 identifies the dependencies 30-1 and 30-2 by accessing the application definition file 22-1. In other implementations, the build container 54 may access a predetermined location, such as a predetermined folder, that will be used to store the dependencies for the container image to be built. It is noted that because the build tool 42-I and the vulnerability extension 44-I are components of the build container 54, functionality implemented by either the build tool 42-I and/or the vulnerability extension 44-I may be attributed herein generally to the build container 54. For example, the vulnerability extension 44-I may be the component of the build container 54 that identifies the dependencies 30-1 and 30-2 as dependencies that will be incorporated into the container image to be built.

The build container 54 accesses vulnerability data 56 that identifies a plurality of dependencies that have one or more vulnerabilities. The vulnerability data 56 may comprise any suitable source or sources of information that identify vulnerabilities in dependencies. In one example, the vulnerability data 56 comprises the National Vulnerability Database (NVD) that identifies security-related software flaws, misconfigurations, product names, security checklist references, and the like. In this example, the vulnerability data 56 comprises a plurality of entries 58-1-58-N, each of which identifies a particular dependency that has a vulnerability. Based on the vulnerability data 56, the build container 54 determines that the dependencies 30-1 and 30-2 are devoid of vulnerabilities. In response to this determination, the build container 54 generates a container image 60 that includes an application executable 62 and the dependencies 30-1, 30-2.

Vulnerabilities typically become known over time, and thus, a dependency that is not known to have a vulnerability at one time may subsequently by determined to have a vulnerability. In such situations, prior to knowledge of the vulnerability, the vulnerability of a dependency is not reflected in the vulnerability data 56, and thus the vulnerability extension 44-I may determine that a dependency is devoid of vulnerabilities and may store such dependency in any number of container images that are built by the build container 54. Subsequently, even if it is determined that the dependency does have one or more vulnerabilities, it may be impractical or impossible to determine the container images that the build container 54 has built using the dependency.

Accordingly, in this example, the build container 54 may automatically, even absent instruction or request, insert or cause to be inserted the vulnerability checking application 38 into container images that the build container 54 builds.

The vulnerability checking application 38 may comprise any suitable application that implements the functionality of checking dependencies for vulnerabilities, such as, by way of non-limiting example, Snyk (available at snyk.io) or any other vulnerability scanning tool. The build container 54 may also generate the container image such that, upon initiation of a container from the container image, the vulnerability checking application 38 is the first application that is initiated upon initiation of the container. In this example, the build container 54 has automatically inserted the vulnerability checking application 38 into the container image 60. Thus, upon initiation of a container from the container image 60, the vulnerability checking application 38 will execute and access vulnerability data to determine whether the dependencies 30-1 and 30-2, subsequent to the generation of the container image 60, were determined to contain vulnerabilities. If so, the container can take any suitable action, such as terminating the container and issuing an alert identifying the dependency 30-1 and/or 30-2 as having a vulnerability, pausing and providing an opportunity for a human, such as the user 48 or operator, to determine whether the container should continue to execute despite the vulnerability or terminate, or the like.

In some implementations, the build container images 40-1-40-N may be stored in a location that prevents access from unauthorized individuals, such as, for example, the user 48, and thus users of the container image builder 18 have no ability to avoid or bypass the protections implemented by the vulnerability extension 44 during container image build time, and the vulnerability checking application 38 during container runtime.

It is noted that while, for purposes of illustration and simplicity, the examples are illustrated as being implemented by the single processor device 14 on the single computing device 12, in other environments, such as a distributed and/or clustered environment, the examples may be implemented on a computer system that includes a plurality of processor devices of a plurality of different computing devices, and functionality of the examples may be implemented on different processor devices of different computing devices. For example, the container image builder 18 may execute on one processor device of one computing device, and may initiate the build container 54 on another computing device that has another processor device set. Thus, irrespective of the implementation, the examples may be implemented on a computer system that includes one or more processor devices of one or more computing devices.

Moreover, because the container image builder 18 and the build container 54 are components of the computing device 12, functionality implemented by the container image builder 18 and the build container 54 may be attributed to the computing device 12 generally. Moreover, in examples where the container image builder 18 and the build container 54 comprise software instructions that program the processor device 14 to carry out functionality discussed herein, functionality implemented by the container image builder 18 and the build container 54 may be attributed herein to the processor device 14.

Figure 2:
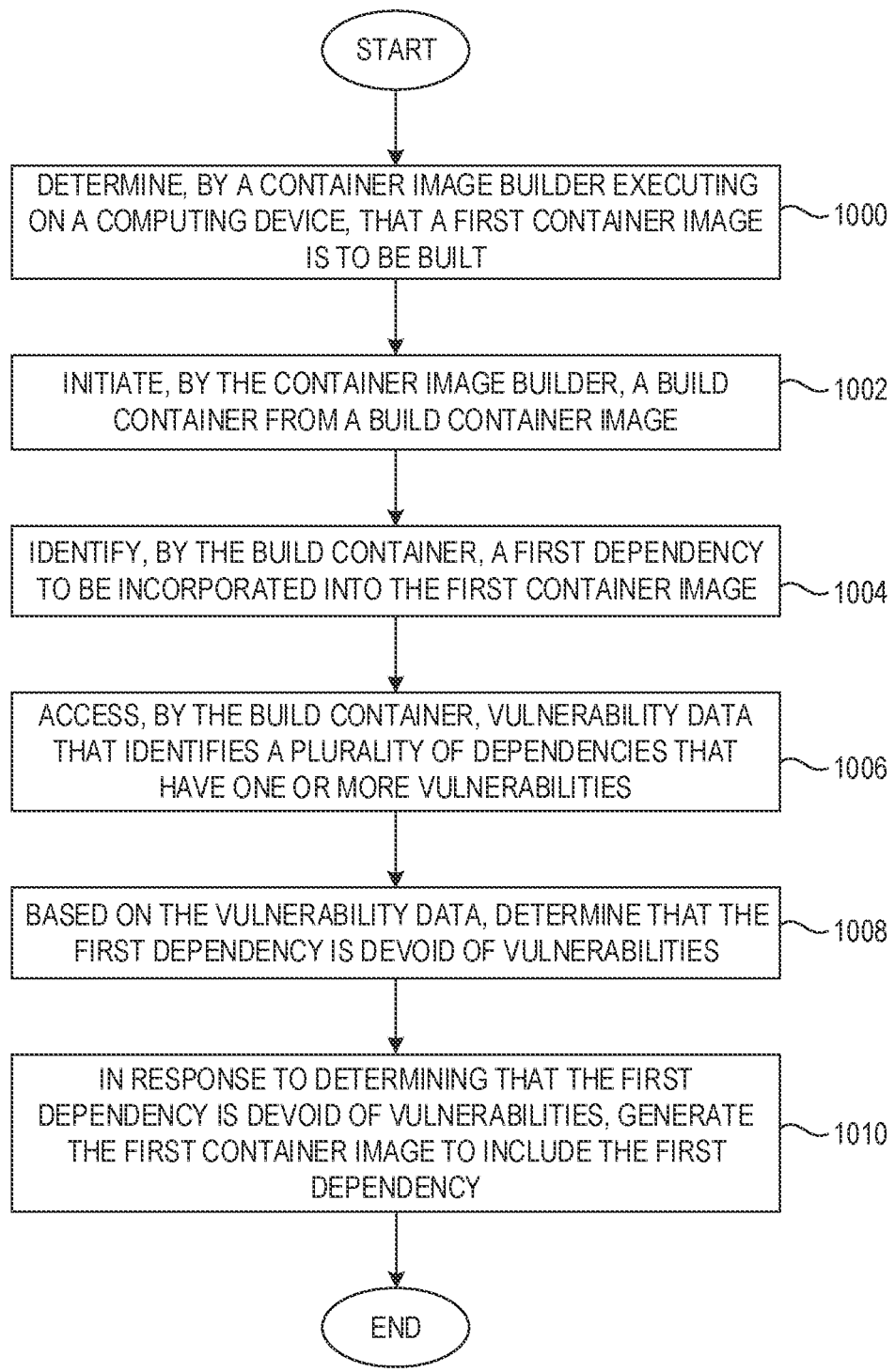
FIG. 2 is a flowchart of a method for secure container image builds according to one example.

FIG. 2 is a flowchart of a method for secure container image builds according to one example. FIG. 2 will be discussed in conjunction with FIG. 1. The container image builder 18 determines that the container image 60 is to be built (FIG. 2, block 1000). The container image builder 18 initiates the build container 54 from the build container image 40-1 (FIG. 2, block 1002). The build container 54 identifies the dependencies 30-1 and 30-2 to be incorporated into the container image 60 (FIG. 2, block 1004). The build container 54 accesses the vulnerability data 56 that identifies a plurality of dependencies that have one or more vulnerabilities (FIG. 2, block 1006). Based on the vulnerability data 56, the build container 54 determines that the dependencies 30-1 and 30-2 are devoid of vulnerabilities (FIG. 2, block 1008). In response to determining that the dependencies 30-1 and 30-2 are devoid of vulnerabilities, the build container 54 generates the container image 60 to include the dependencies 30-1 and 30-2 (FIG. 2, block 1010).

Figure 3:
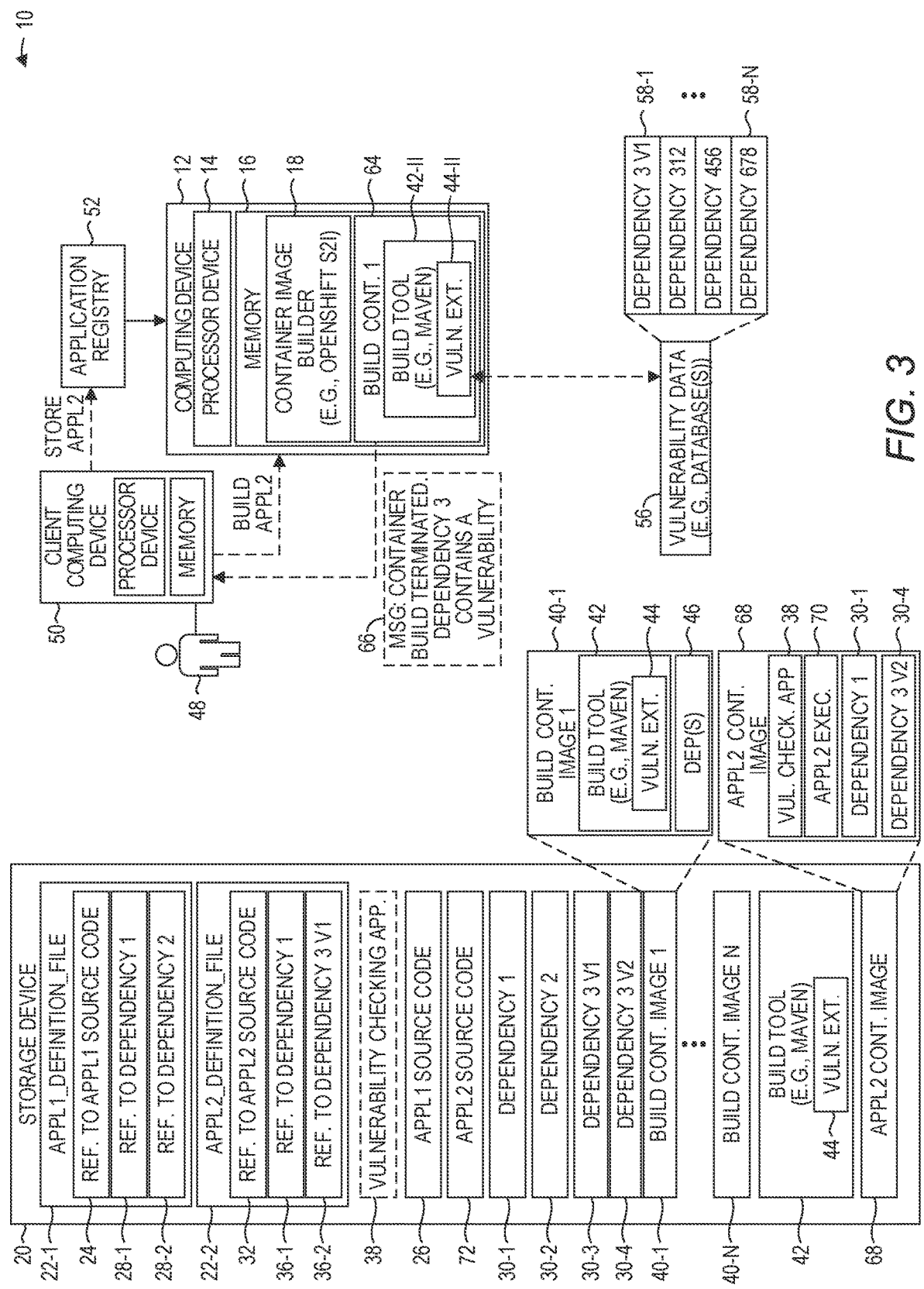
FIG. 3 is a block diagram of the environment illustrating another example.

FIG. 3 is a block diagram of the environment 10 illustrating another example. In this example, the user 48 accesses the client computing device 50 and sends, via the client computing device 50, a request to the container image builder 18 to build another container image. The container image builder 18 initiates a build container 64 from the build container image 40-1. The build container 64 executes in the memory 16 and includes a build tool instance 42-II, which is a runtime instance of the build tool 42, and a vulnerability extension instance 44-II, which is a runtime instance of the vulnerability extension 44. In this example, the user 48 provided the name and location of the application definition file 22-2 to the container image builder 18, or the application definition file 22-2 was stored in a predetermined location that is used by the build container 64 to determine the application information for the container image to be built.

The build container 64 identifies the dependencies 30-1 and 30-3 as dependencies that will be incorporated into the container image to be built. In this example, the build container 64 identifies the dependencies 30-1 and 30-3 by accessing the application definition file 22-2. In other implementations, the build container 64 may access a predetermined location, such as a predetermined folder, that will be used to store the dependencies for the container image to be built.

The build container 64 accesses the vulnerability data 56 that identifies a plurality of dependencies that have one or more vulnerabilities. In this example, based on the entry 58-1 of the vulnerability data 56, the build container 64 determines that the dependency 30-3 contains a vulnerability. In response to determining that the dependency 30-3 contains a vulnerability, the build container 64 takes an action. The action taken may be system dependent, configuration dependent, or based on some characteristics of the vulnerability itself as indicated by the vulnerability data 56.

For example, the build container 64 may inhibit the generation of the container image. The build container 64 may also send an alert 66 to an operator or the user 48 that indicates that the container image will not be built and/or indicates that the dependency 30-3 contains a vulnerability.

As another example, the build container 64 may automatically determine whether there are other versions of the dependency 30-3, such as subsequent versions, that are compatible with the dependency 30-3 and that are devoid of vulnerabilities. In this example, the build container 64 determines that a dependency 30-4 is a backward compatible version of the dependency 30-3. The build container 64 accesses the vulnerability data 56 and determines that the dependency 30-4 is devoid of vulnerabilities. The build container 64 then automatically, without human involvement, generates a container image 68 that includes an application executable 70 based on an application source 72, the dependencies 30-1, 30-4, and the vulnerability checking application 38. In this manner, the build container 64 automatically replaces a version of a dependency that has known vulnerabilities with a dependency that has no known vulnerabilities, irrespective of the contents of the application definition file 22-2.

As another example, the build container 64 may send an alert to an operator or the user 48 indicating that the dependency 30-3 contains a vulnerability, and provide an opportunity for the recipient of the alert to provide an instruction to proceed or terminate. If the instruction is to proceed, the build container 64 may generate a new container image that includes the dependency 30-3, despite the dependency 30-3 containing a vulnerability.

Figure 4:
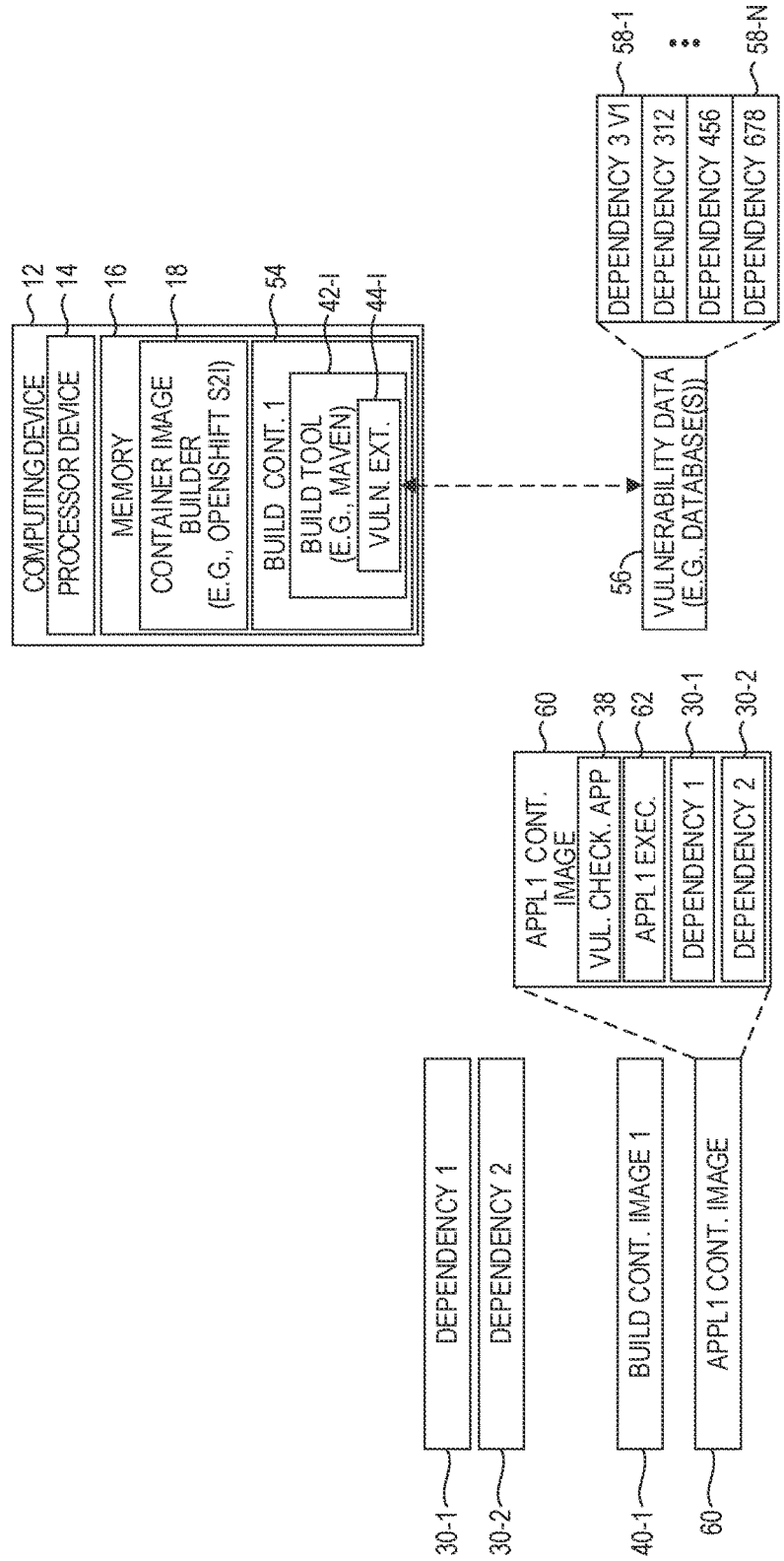
FIG. 4 is a simplified block diagram of the environment illustrated in FIG. 1 according to one implementation.

FIG. 4 is a simplified block diagram of the environment 10 illustrated in FIG. 1 according to one implementation. The environment 10 includes the computing device 12 and the one or more processor devices 14. The one or more processor devices 14 are to determine, by the container image builder 18, that the container image 60 is to be built. The one or more processor devices 14 are further to initiate, via the container image builder 18, the build container 54 from the build container image 40-1. The one or more processor devices 14 are further to identify, via the build container 54, the dependencies 30-1 and 30-2 to be incorporated into the container image 60. The one or more processor devices 14 are further to access, by the build container 54, the vulnerability data 56 that identifies a plurality of dependencies that have one or more vulnerabilities. The one or more processor devices 14 are further to, based on the vulnerability data 56, determine that the dependencies 30-1 and 30-2 are devoid of vulnerabilities. The one or more processor devices 14 are further to, in response to determining that the dependencies 30-1 and 30-2 are devoid of vulnerabilities, generate the container image 60 to include the dependencies 30-1 and 30-2.

Figure 5:
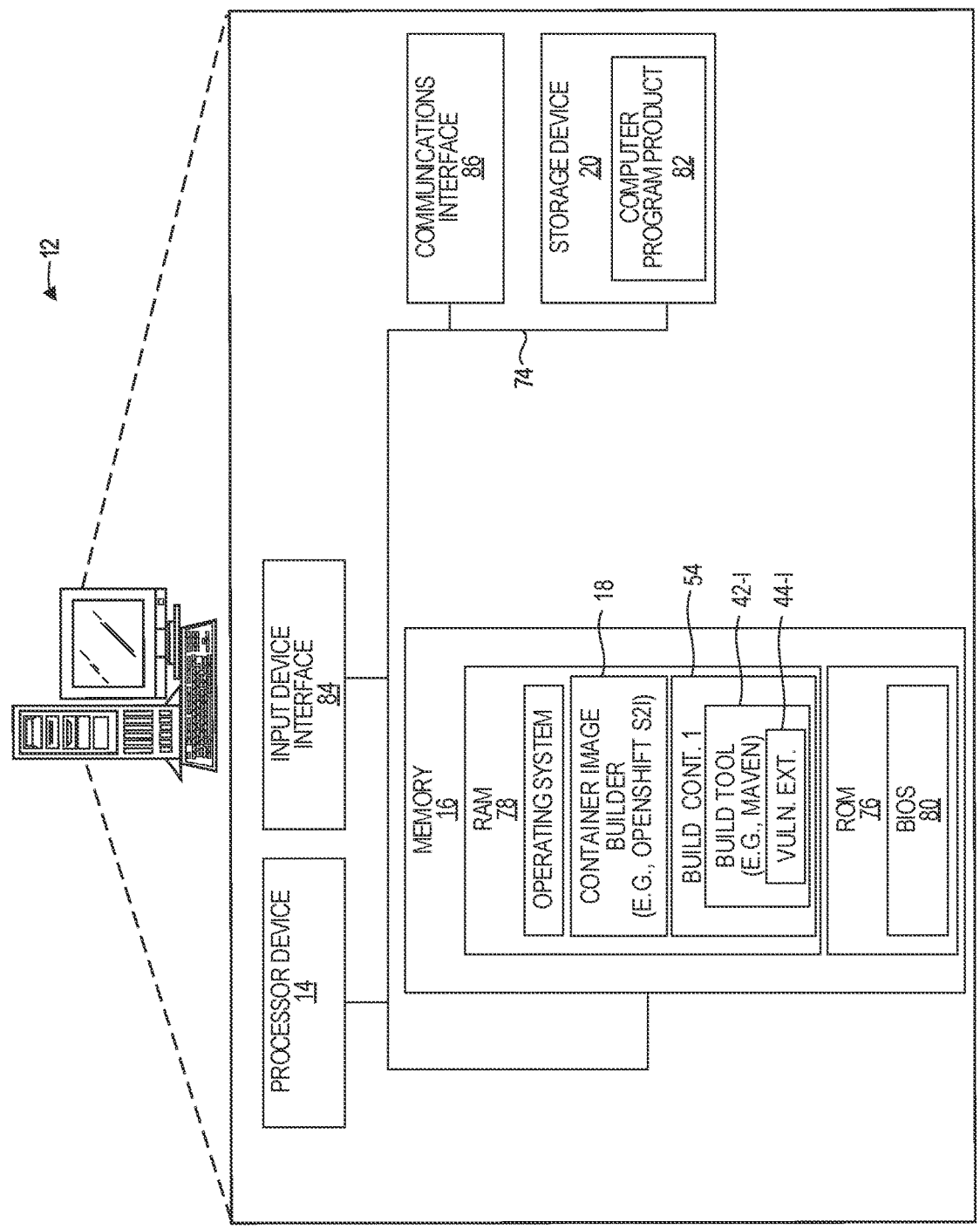
FIG. 5 is a block diagram of a computing device suitable for implementing examples according to one example.

FIG. 5 is a block diagram of the computing device 12 suitable for implementing examples according to one example. The computing device 12 may comprise any computing or electronic device capable of including firmware, hardware, and/or executing software instructions to implement the functionality described herein, such as a computer server, a desktop computing device, a laptop computing device, or the like. The computing device 12 includes one or more processor devices 14, the memory 16, and a system bus 74. The system bus 74 provides an interface for system components including, but not limited to, the memory 16 and the processor device 14. The processor device 14 can be any commercially available or proprietary processor.

The system bus 74 may be any of several types of bus structures that may further interconnect to a memory bus (with or without a memory controller), a peripheral bus, and/or a local bus using any of a variety of commercially available bus architectures. The memory 16 may include non-volatile memory 76 (e.g., read-only memory (ROM), erasable programmable read-only memory (EPROM), electrically erasable programmable read-only memory (EEPROM), etc.), and volatile memory 78 (e.g., random-access memory (RAM)). A basic input/output system (BIOS) 80 may be stored in the non-volatile memory 76 and can include the basic routines that help to transfer information between elements within the computing device 12. The volatile memory 78 may also include a high-speed RAM, such as static RAM, for caching data.

The computing device 12 may further include or be coupled to a non-transitory computer-readable storage medium such as the storage device 20, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like.

A number of modules can be stored in the storage device 20 and in the volatile memory 78, including an operating system and one or more program modules, such as the container image builder 18 and the build container 54, which may implement the functionality described herein in whole or in part. All or a portion of the examples may be implemented as a computer program product 82 stored on a transitory or non-transitory computer-usable or computer-readable storage medium, such as the storage device 20, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14, in conjunction with the container image builder 18 and the build container 54 in the volatile memory 78, may serve as a controller, or control system, for the computing device 12 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 14 through an input device interface 84 that is coupled to the system bus 74 but can be connected by other interfaces such as a parallel port, an Institute of Electrical and Electronic Engineers (IEEE) 1394 serial port, a Universal Serial Bus (USB) port, an IR interface, and the like. The computing device 12 may also include a communications interface 86 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
   determining, by a container image builder executing on a computing device, that a first container image is to be built;
   initiating, by the container image builder, a build container from a build container image;
   identifying, by the build container, a first dependency to be incorporated into the first container image;
   accessing, by the build container, vulnerability data that identifies a plurality of dependencies that have one or more vulnerabilities;
   based on the vulnerability data, determining that the first dependency is devoid of vulnerabilities; and
   in response to determining that the first dependency is devoid of vulnerabilities, generating the first container image to include the first dependency.

2. The method of claim 1 wherein determining that the first container image is to be built comprises receiving, by the container image builder from an application, a request to build the first container image, the request including information identifying a location of application information regarding a first application to be included in the first container image.

3. The method of claim 1 wherein initiating the build container comprises:

analyzing, by the container image builder, an application file that will be used to build the first container image; and based on an attribute of the application file, selecting the build container image from a plurality of different build container images.

4. The method of claim 1 wherein identifying the first dependency comprises accessing a configuration file that identifies a plurality of dependencies, including the first dependency, that are to be included in the first container image.

5. The method of claim 1 further comprising:
causing a vulnerability checking application to be inserted into the first container image; and
causing the vulnerability checking application to be a first initiated application upon initiation of a container from the first container image.

6. The method of claim 1 further comprising:
determining, by the container image builder, that a second container image is to be built;
initiating, by the container image builder, the build container from the build container image;
identifying, by the build container, a second dependency to be incorporated into the second container image;
accessing, by the build container, the vulnerability data that identifies the plurality of dependencies that have one or more vulnerabilities;
based on the vulnerability data, determining that the second dependency contains a vulnerability; and
taking an action based on determining that the second dependency contains the vulnerability.

7. The method of claim 6 wherein taking the action comprises inhibiting a generation of the second container image.

8. The method of claim 6 wherein taking the action comprises:
identifying a version of the second dependency;
identifying a third dependency that is a different version of the second dependency and that is devoid of vulnerabilities; and
generating the second container image to include the third dependency in lieu of the second dependency.

9. The method of claim 6 wherein taking the action comprises:
sending an alert indicating that the second dependency contains the vulnerability;
receiving a response that authorizes generation of the second container image; and
generating the second container image to include the second dependency.

10. The method of claim 1 further comprising:
generating the build container image to include a vulnerability extension that is configured to:
identify one or more dependencies of a container image to be built; and
access the vulnerability data to determine whether any dependency of the one or more dependencies of the container image to be built contains a vulnerability.

11. The method of claim 10 further comprising:
modifying a Maven build automation tool to include the vulnerability extension that is invoked by the Maven build automation tool; and
generate the build container image to include the Maven build automation tool.

12. A computer system, comprising:
one or more processor devices of one or more computing devices to:

determine, by a container image builder, that a first container image is to be built;
initiate, by the container image builder, a build container from a build container image;
identify, by the build container, a first dependency to be incorporated into the first container image;
access, by the build container, vulnerability data that identifies a plurality of dependencies that have one or more vulnerabilities;
based on the vulnerability data, determine that the first dependency is devoid of vulnerabilities; and
in response to determining that the first dependency is devoid of vulnerabilities, generate the first container image to include the first dependency.

13. The computer system of claim 12 wherein to identify the first dependency the one or more processor devices are further to access a configuration file that identifies a plurality of dependencies, including the first dependency, that are to be included in the first container image.

14. The computer system of claim 12 where the one or more processor devices are further to:
cause a vulnerability checking application to be inserted into the first container image; and
cause the vulnerability checking application to be a first initiated application upon initiation of a container from the first container image.

15. The computer system of claim 12 wherein the one or more processor devices are further to:
determine, by the container image builder, that a second container image is to be built;
initiate, by the container image builder, the build container from the build container image;
identify, by the build container, a second dependency to be incorporated into the second container image;
access, by the build container, the vulnerability data that identifies the plurality of dependencies that have one or more vulnerabilities;
based on the vulnerability data, determine that the second dependency contains a vulnerability; and
take an action based on determining that the second dependency contains the vulnerability.

16. The computer system of claim 15 wherein to take the action the one or more processor devices are further to:
identify a version of the second dependency;
identify a third dependency that is a different version of the second dependency and that is devoid of vulnerabilities; and
generate the second container image to include the third dependency in lieu of the second dependency.

17. A non-transitory computer-readable storage medium that includes executable instructions configured to cause one or more processor devices of one or more computing devices to:
determine, by a container image builder, that a first container image is to be built;
initiate, by the container image builder, a build container from a build container image;
identify, by the build container, a first dependency to be incorporated into the first container image;
access, by the build container, vulnerability data that identifies a plurality of dependencies that have one or more vulnerabilities;
based on the vulnerability data, determine that the first dependency is devoid of vulnerabilities; and
in response to determining that the first dependency is devoid of vulnerabilities, generate the first container image to include the first dependency.

18. The non-transitory computer-readable storage medium of claim 17 wherein to identify the first dependency the instructions further cause the one or more processor devices to access a configuration file that identifies a plurality of dependencies, including the first dependency, that are to be included in the first container image.

19. The non-transitory computer-readable storage medium of claim 17 wherein the instructions further cause the one or more processor devices to:
   cause a vulnerability checking application to be inserted into the first container image; and
   cause the vulnerability checking application to be a first initiated application upon initiation of a container from the first container image.

20. The non-transitory computer-readable storage medium of claim 17 wherein the instructions further cause the one or more processor devices to:
   determine, by the container image builder, that a second container image is to be built;
   initiate, by the container image builder, the build container from the build container image;
   identify, by the build container, a second dependency to be incorporated into the second container image;
   access, by the build container, the vulnerability data that identifies the plurality of dependencies that have one or more vulnerabilities;
   based on the vulnerability data, determine that the second dependency contains a vulnerability; and
   take an action based on determining that the second dependency contains the vulnerability.

* * * * *